Figure 4:
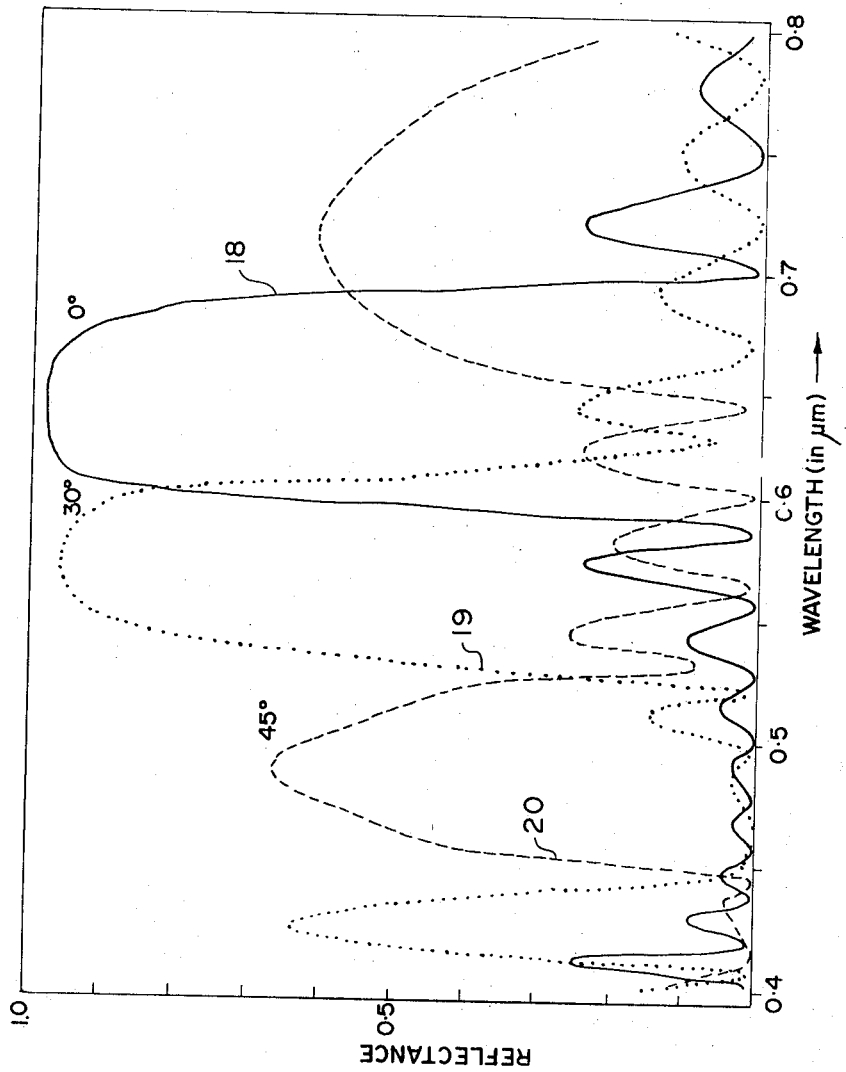

United States Patent [19]
Baird et al.

[11] 3,858,977
[45] Jan. 7, 1975

[54] OPTICAL INTERFERENCE AUTHENTICATING MEANS

[75] Inventors: Kenneth M. Baird; Jerzy A. Dobrowolski, both of Ottawa; Allan J. Waldorf, Kemptville; Philip D. Carman, Ottawa, Ontario, all of Canada

[73] Assignee: Canadian Patent and Development Limited, Ottawa, Canada

[22] Filed: Sept. 26, 1973

[21] Appl. No.: 400,939

Related U.S. Application Data

[63] Continuation-in-part of Ser. No. 305,069, Nov. 9, 1972, abandoned.

[30] Foreign Application Priority Data
Jan. 18, 1972 Canada .............................. 132683

[52] U.S. Cl..................... 356/71, 350/166, 350/318
[51] Int. Cl. .............................................. G01k 9/08
[58] Field of Search ....... 356/71; 350/164, 166, 318

[56] References Cited
UNITED STATES PATENTS

| | | | |
|---|---|---|---|
| 3,287,825 | 11/1966 | Ryan et al........................... | 350/318 |
| 3,410,626 | 11/1968 | Magrath.............................. | 350/166 |
| 3,637,294 | 1/1972 | Berthold............................. | 350/166 |

*Primary Examiner*—Vincent P. McGraw
*Attorney, Agent, or Firm*—Francis W. Lemon

[57] ABSTRACT

An optical interference, authenticating means, comprising a substrate, and a filter composed of at least one optical interference layer having a known characteristic of spectral reflectance and a different, known characteristic of spectral transmittance, both of which vary with the angle of incidence of light on the filter. The substrate, which may be a portion of a valuable document such as a bank note, has a portion of the surface adjacent to the filter coloured to absorb some of the light transmitted by the filter.

8 Claims, 10 Drawing Figures

OPTICAL INTERFERENCE AUTHENTICATING MEANS

This application is a continuation-in-part of application Ser. No. 305,069, now abandoned.

This invention relates to an optical interference, authenticating means.

Counterfeiting of valuable papers and of identification documents made of paper or plastics, such as bank notes, credit cards, passports and passes is presently inhibited more or less successfully through the use of inks of many colours and intricate engraved designs on special papers which sometimes contain watermarks or embedded coloured paper platelets or metal threads. These methods have not always offered sufficiently discriminating tests to prevent, in some instances, spurious bank notes and other documents from being passed to the man in the street, in shops, and even in banks.

It is one object of the present invention to provide an authenticating means, which may incorporate or be used in conjunction with one or more of the above mentioned methods to provide better protection against the performance of counterfeiters and forgers.

Another object of the present invention is to provide an authenticating means which provides more discriminating tests of the authenticity of a valuable paper or identification document for the man in the street, for the shop or bank, and for the crime laboratory than known types of authenticating means.

It would be desirable to provide an authenticating means for, say, valuable papers and identification documents whereby the authenticating equipment makes use of new technologies and requires large capital outlays that are beyond the means of most counterfeiters.

A further object of the present invention is to provide an authenticating means for, say, valuable papers and identification documents which makes use of a relatively new technology for the manufacture of the authenticating means, requiring large capital outlays for equipment that are beyond the means of most counterfeiters.

The present invention, in some embodiments, makes use of particular optical thin film multilayer coatings hereinafter referred to as optical interference layers. In recent years advances have been made in the preparation of optical thin film coatings by methods such as vacuum evaporation, sputtering, chemical deposition from vapours or organic solutions, see, for example, L. I. Maissel and R. Glang, "Handbook of Thin Film Technology," McGraw-Hill, 1970. Consequently such coatings find increasing use as optical filters. By depositing onto a suitable substrate a number of layers made of suitable materials and having appropriate thicknesses it is possible to make antireflection coatings, high reflectance coatings, beam splitters, heat reflectors, narrow band pass filters, etc., see, H. A. MacLeod, "Thin Film Optical Filters," American Elsevier, New York 1969.

Spectral reflectance and spectral transmission characteristics depend on the optical constants, refractive indices, absorption coefficients and thicknesses of the optical thin film coatings, but as is known to persons skilled in the art, these characteristics are affected by other factors, for example, angle of incidence and state of polarization of the incident light, and materials (in film or bulk form) surrounding the layers, and so these other factors must also be taken into account when observing these characteristics.

One property of such multilayer optical filters is that their spectral reflectance and transmittance characteristics vary with the angle of incidence of the light on the coating. This means that the observed hues of the light transmitted or reflected by the filter will also vary. For all the above mentioned applications this variation in hues is a decided disadvantage and efforts are often made to minimize these effects.

The authenticating means according to the present invention also makes use of optical coatings or multilayer coatings. However, unlike in the case of the filters described above, the observed variation in the colour with angle of incidence of the light transmitted or reflected by the optical interference layers of authenticating means according to the present invention is desirable and efforts should be made to maximize it. For in this respect the authenticating means according to the present invention differ essentially from all known types of dyes, inks, pigments and paints used in printing, photography and colour copying machines.

Thus in this specification "optical interference layers" are defined as optical thin film multilayer coatings wherein the observed variation in the hue with angle of incidence of the light transmitted or reflected by the optical thin film multilayer coatings is significant.

According to the present invention there is provided an optical interference, authenticating means, comprising a substrate, and a filter composed of at least one optical interference layer overlying and attached to the said substrate, said filter having a known characteristic of spectral reflectance and a different known characteristic of spectral transmittance, both of said characteristics varying with the angle of incidence of light on the said filter, and said substrate having at least a portion of the surface thereof, adjacent to said filter, coloured a particular colour to absorb some of the light, which is transmitted through the said filter.

By using the conventional thin film design techniques reviewed by H. A. MacLeod referred to above or an automatic thin film synthesis program described by J. A. Dobrowolski in Applied Optics 4,937 (1965); ibid 9, 1936 (1970) the thicknesses and refractive indexes of the optical interference layers may be chosen to yield a strong coloration of the transmitted and reflected beam that varies rapidly in hue with change in the angle of incidence of the beam.

The present invention makes use of the fact that the reflected colour from a white light that one would actually perceive when such a filter is attached to an opaque substrate depends strongly on the colour of the surface of the substrate. For example, a free standing nine layer filter composed of alternate optical interference layers of zinc sulphide and magnesium fluoride may have a high reflectance in the red part of the spectrum, and when viewed at increasing angles of incidence the wavelength of the main reflectance peak shifts from the red through the yellow and green towards the blue part of the spectrum. But the colour that one would actually perceive when such a coating is attached to an opaque surface will depend strongly on the spectral absorption characteristics and thus colour of that surface. Since at normal incidence the filter will strongly reflect red light, light of shorter wavelengths will be transmitted by the filter and will fall on to the opaque surface. Some of the light falling on the opaque surface is reflected back by this surface and transmitted out again by the filter, and if this is substantially all of the light transmitted by the filter, then the reflected light from the surface will recombine with the reflected light from the filter to produce, what is observable by the eye as, white light once more.

If a suitable combination of optical interference coatings and surface colour and pattern of the substrate are chosen, it is possible to obtain interesting colour effects. A maximum colour contrast is obtained where the surface of the substrate is coloured black. On the other hand, no colour is observed where the substrate is coloured white because the white colour substantially does not absorb. Thus, a black silhouette on a white background on the substrate will only show the silhouette brightly revealed in the hue reflected by the filter.

As this effect cannot be duplicated by any paint, pigment or colour copying procedure it should therefore enable the man in the street to distinguish at a glance an authentic valuable paper bearing such optical interference layers from even the best counterfeit lacking this authenticating device.

Figure 2C:
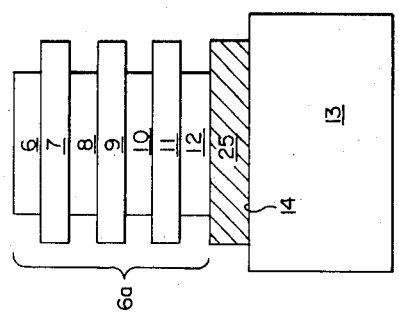
Figure 2B:
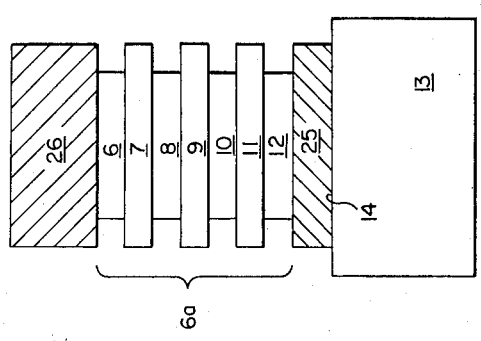
Figure 2A:
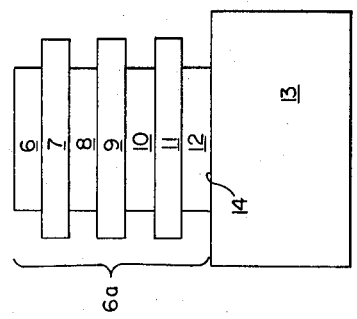
Figure 1:
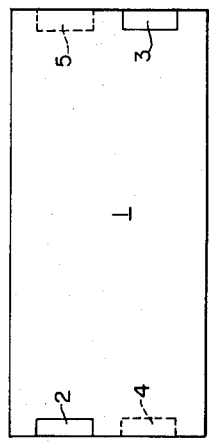
Figure 3:
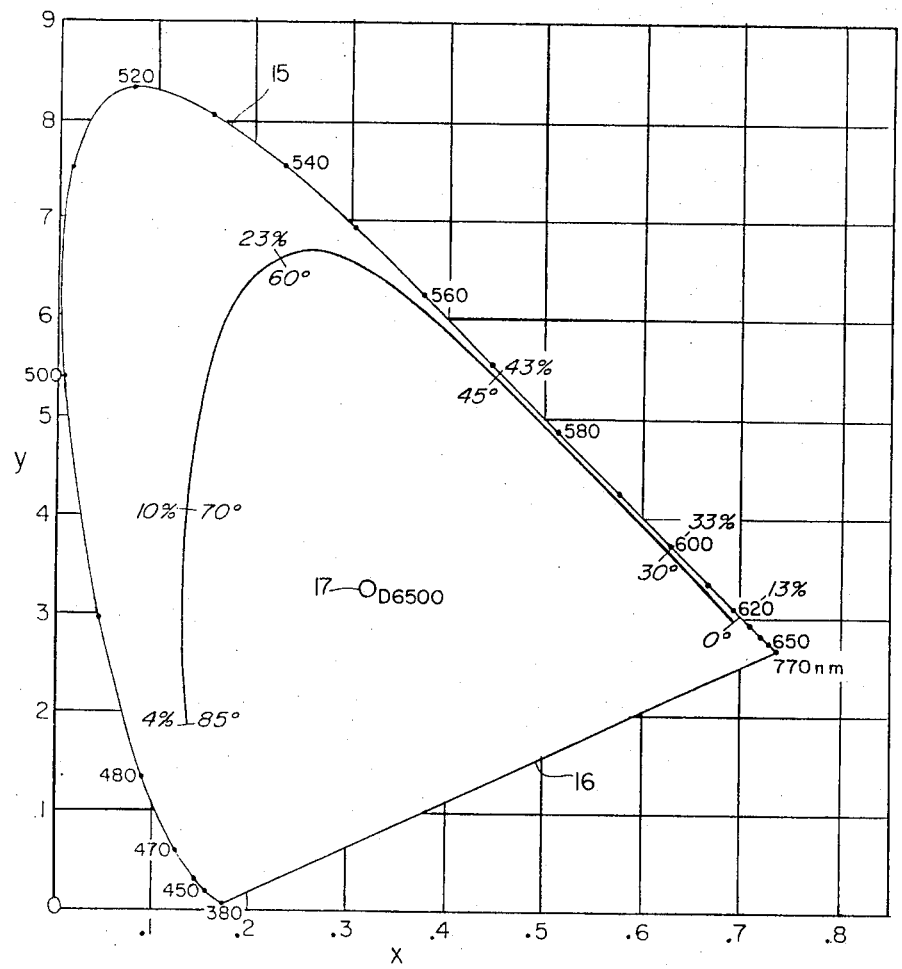
Figure 5:
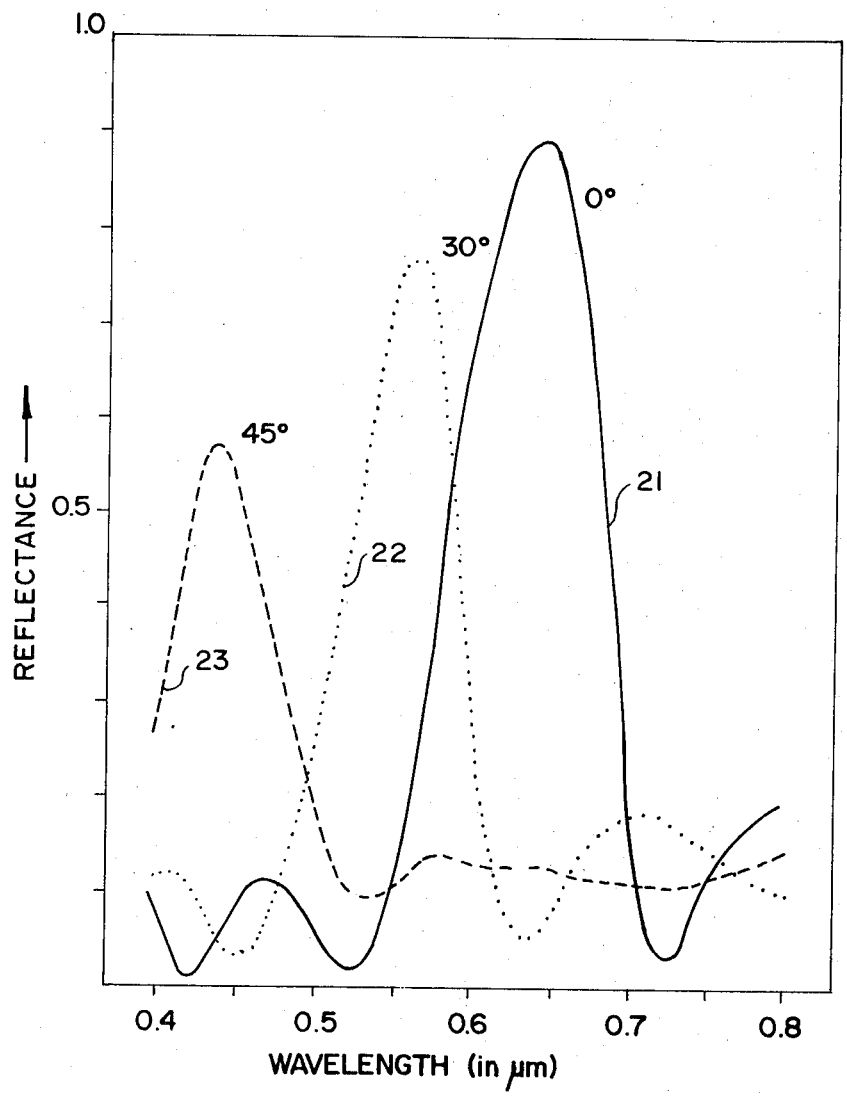
Figure 6:
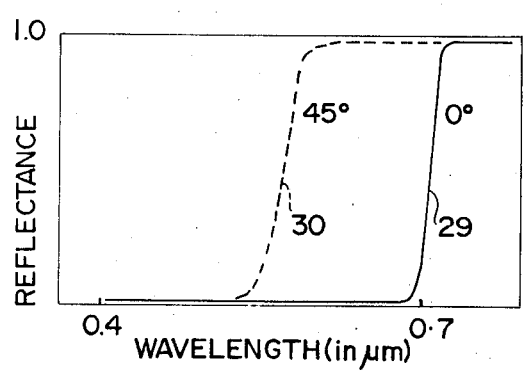
Figure 7:
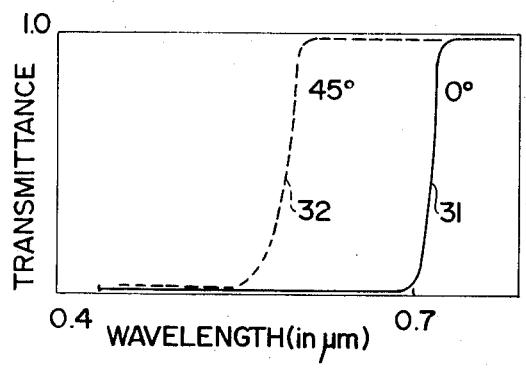
Figure 8:
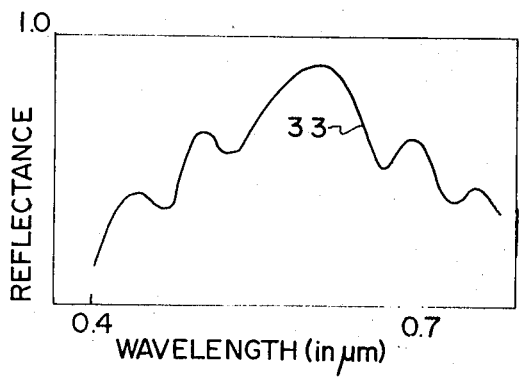

In the accompanying drawings which illustrate, by way of example, the embodiments of the present invention, FIG. 1 is a front view of a Canadian Twenty dollar bank note, bearing optical interference, authenticating means, FIGS. 2a–2c are enlarged, schematic cross-sections of different embodiments of a multi-layer optical interference, authenticating means deposited onto a suitable substrate, as might be applied to the bank note of FIG. 1, FIG. 3 is a CIE chromaticity diagram, FIGS. 4 and 5 represent the spectral reflectance curves for three different angles of incidence of light of two optical interference, authenticating means suitable for use in reflected light, FIGS. 6 and 7 illustrate the action of two special optical interference, authenticating multilayer coatings which permit a positive indentification not dependent on colour vision, and FIG. 8 represents the spectral reflectance characteristics of an optical interference, authenticating means designed to be difficult to imitate even by counterfeiting operations with fairly large financial resources.

FIG. 1 represents an opaque Canadian twenty dollar bill 1 with optical interference, authenticating means each in the form of coatings 2 and 3 applied to the front side, and similar coatings 4 and 5 (shown dotted) applied to the rear side of the bank note. If the authenticating coatings are arranged in this way, then in whatsoever a manner a number of bank notes 1 are assembled as a wad a coating 2, 3, 4, or 5 will always appear in the top left hand corner, and another one will always appear in the lower righthand corner of the wad. Thus, without arranging all of the bank notes 1 of a wad face upwardly, or with all of them with the figures up the right way, it is possible to flick through the corners to reveal a coating 2, 3, 4 or 5 and to detect at a glance spurious bank notes.

Referring now to FIG. 2a, each optical interference, authenticating means or coating 2 to 5 (FIG. 1) consists of a substrate 13 and a plurality of optical interference layers 6 to 12 which form a filter 6a. The filter 6a has a known characteristic of spectral reflectance, and a different, known characteristic of spectral transmittance. The substrate 13 has at least a portion of its surface 14 coloured a particular colour to absorb at least some of the light transmitted through the filter 6a. Each layer 6 to 12 may be deposited by one of the techniques mentioned above, directly onto the substrate, which is part of the document to be protected, if the surface finish of the latter is good enough. But it is often more convenient and satisfactory to first deposit the layers onto a suitable carrier 26 (FIG. 2b) in the form of a transparent or coloured polyester film. When the filter 6a is deposited on a polyester film it may be manufactured in one length which is then cut into small strips to form the coatings 2 to 5. The coatings 2 to 5 may then be secured to the valuable paper by means of a suitable adhesive 25 which must be transparent if the colour of the substrate surface 14 is to interact with the light transmitted by the filter 6a. In another embodiment of the invention the adhesive 25 may contain a dye and then the adhesive itself will provide the coloured surface 14 necessary for obtaining colour contrast. The adhesive 25 is applied to the layer 12 and the polyester film 26 which is in contact with layer 6, may be retained to provide protection to the filter 6a as a protective covering. Alternatively, the polyester carrier 26 can be removed after the filter 6a has been attached to the substrate (FIG. 2c).

In another embodiment the carrier 26 of FIG. 2b forms the substrate 13 shown in FIG. 2c the carrier 26 is then for attachment to an article to be authenticated.

With the filter 6a disposed in the path of a light beam, with the light of the light beam impinging on all of the layers 6 to 12, the filter 6a will reflect light of a certain hue and transmit light of a different hue and this will vary with the angle of incidence of light thereon. However, the surface 14 is coloured a particular colour to absorb some of the light transmitted through the filter 6a.

The sensitivity of the human eye to light of different colours varies greatly. Quite conceivably a fairly low secondary reflectance maximum in the green part of the spectrum might have a greater affect on the colour that is perceived by the human eye than the main red maximum. An appropriate way of describing the behaviour of the filter 6a is with the aid of the CIE chromaticity diagram shown in FIG. 3. The curved boundary 15 is the spectrum locus, that is, the position on the diagram of pure colours. All real colours lie within the area bounded by the curved boundary 15 and the line 16 joining the blue and red ends of the curved boundary 15. The white patch 17 represents the achromatic point. All points on a line joining the achromatic point or white patch 17 and a point on the spectrum locus or curved boundary 15 have the same hue or dominant wavelength and differ from one another only by the degree of saturation or purity. Pale and impure colours lie close to the achromatic point or white patch 17, purer colours lie close to the spectrum locus or curved boundary 15.

Two samples may be the same colour, yet one may appear very bright and the other almost black. To indicate this quantitatively the luminous reflectance can be specified.

Besides the colour of the surface of the substrate, another circumstance that will affect the appearance of the coating/substrate combination is whether the substrate reflects specularly or diffusely. Diffuse reflection takes place when the coating is attached with a transparent cement to a rough surface. Approximately specular reflectance is observed when the surface 14 is substantially smooth, and this may be achieved when the adhesive used to attach the coating to the substrate 5 contains a dye or pigment.

To summarise, the visual appearance of the filter/substrate combination can be specified by a point on the CIE chromaticity diagram shown in FIG. 3, and this method has the advantage that is reveals a minimum of information about the structure of the filter.

The layers 6 to 12 (FIG. 2) may be made of any of the commonly used non-absorbing optical coating materials such as, for example, cryolite, $MgF_2$, SiO, $SiO_2$, $ThF_4$, $TiO_2$, ZnS and $ZrO_2$, or absorbing materials such as, for example, Ag, Al, Au, Cu, Cr, Ge, Ni, NiCr, and Si, or any other materials that form satisfactory layers or coatings. The thicknesses of the layers will normally be within one or two orders of magnitude of $0.1\mu m$.

As explained above, the spectral reflectance and transmittance of an optical thin film system depends on the number of layers, their thicknesses and the materials used for their construction. By a suitable choice of these parameters varous different effects can be achieved. By way of example, the construction parameters of the layers of a filter of an authenticating means are shown in Tables I, and II respectively. In both cases the aim was an authenticating means that would appear red when viewed normally and whose peak reflectance would, on tilting, gradually shift towards the blue part of the spectrum. For maximum colour effect the width of the spectral region isolated should not be too wide and the transition from low to high reflection should be sharp. The system of Table I utilizes only materials for the layers that do not absorb in the visible part of the spectrum. Such a system is usually more efficient than that given in Table II which also uses absorbing materials. However, the overall thicknesses of systems containing absorbing layers are usually considerably thinner, and consequently such coatings should be cheaper to produce.

TABLE I

Construction parameters of the filter of FIG. 4.

| Layer number | Thickness (in $\mu m$) | Material |
| --- | --- | --- |
| 1 | 0.204 | ZnS |
| 2 | 0.355 | $MgF_2$ |
| 3 | 0.204 | ZnS |
| 4 | 0.355 | $MgF_2$ |
| 5 | 0.204 | ZnS |
| 6 | 0.355 | $MgF_2$ |
| 7 | 0.204 | ZnS |
| 8 | 0.355 | $MgF_2$ |
| 9 | 0.204 | ZnS |

TABLE II

Construction parameters of the filter of FIG. 5.

| Layer number | Thickness (in $\mu m$) | Material |
| --- | --- | --- |
| 1 | 0.216 | Al |
| 2 | 0.010 | Ni |
| 3 | 0.220 | $SiO_2$ |
| 4 | 0.005 | Ni |
| 5 | 0.250 | $SiO_2$ |
| 6 | 0.008 | Cu |

In FIG. 4 are shown the calculated reflectance curves 18, 19, 20 for 0°, 30°, and 45° incidence for an authenticating means of the type shown in Table I. It should be remembered, however, that because only non-absorbing layer materials were used in the construction of the optical interference layers of the filter, the viewer will see, in addition to the light reflected by these optical interference layers, light reflected by a surface layer of the substrate. As stated above, interesting colour effects can be obtained with a suitable combination of colours of substrate, which may be a portion of a document, and of the characteristics of the optical interference layers. However, if maximum colour contrast is desired, the surface layer of the portion of the surface of the substrate to reflect light should preferably be black.

The authenticating means whose constructions parameters are shown in Table II utilizes light absorbing layer materials as well as non-light-absorbing materials in such a way as to obtain a nearly square shaped reflection band. In this it differs from the narrow band reflection filters such as those described by A. F. Turner and H. R. Hopkinson, J. Opt. Soc. Amer. 43, 819 (1953). The authenticating means is opaque and so it does not require a black background for maximum contrast. In FIG. 5 are shown the calculated reflectance curves 21, 22, 23 for an authenticating means of this type for light incident at 0°, 30°, and 45° respectively.

Optical interference, authenticating means of the type illustrated in Tables I, and II, and in FIGS. 4 and 5 are to be construed only to be examples of the very many different optical interference, authenticating means according to the present invention that can be made. Thus, for instance, it is a simple matter to design layers or coatings that are peaked at different parts of the spectrum and that on tilting undergo a different sequence of colour changes.

The principle of special authenticating means, according to the present invention, whose operation is not dependent on colour vision is illustrated by the spectral reflectance curves 29, 30 shown in FIG. 6. The authentication means comprises a filter which has very little reflectance in the visible part of the spectrum but has a high reflectance in the near infrared spectral region, on a substrate having a black coloured surface adjacent the filter. The transition from the low to the high reflectance regions should be sharp for maximum effect. The black colour may be printed on a portion of the valuable paper or identification document forming the substrate and little light will be reflected at normal incidence. On tilting the high reflection region will move into the visible part of the spectrum and a strong reflection will be observed.

The principle of another special authenticating means, according to the invention, whose operation is not dependent on colour vision is illustrated by the spectral transmittance curves 31, 32 shown in FIG. 7. This authenticating means comprises a filter in the form of a broadband high reflectance coating for the visible part of the spectrum with a sharp transition to a high transmittance in the near infrared region and a substrate having the surface adjacent the filter coloured with patterns or inscriptions. At normal incidence (curve 31) the coating would look like a mirror. On tilting (curve 32) the transmission region would gradually shift into the visible spectral region and patterns and inscriptions of the substrate which may be a printed portion of the valuable paper or identification document would become visible.

Curve 33 in FIG. 8 illustrates the fact that it is possible to construct filters of multilayers or coatings with quite complicated spectral transmittance or reflectance characteristics. Designs with certain predefined spectral reflectance curves can be obtained through the use of automatic thin film synthesis programs. The present day state of the art of spectroscopic analysis and electron microscopy seems inadequate to deduce completely the design of such complicated multilayers or coatings. Accordingly optical interference, authenticating means of this type would be difficult to imitate even by counterfeiting operations backed by unlimited financial resources. Using an automatic thin film synthesis program it might be possible to generate an optical interference, authenticating means whose spectral characteristics were a rough approximation in a certain spectral region of those of the original. However by examining it over a more extended spectral region and for different angles of incidence of the light using routine laboratory spectrophotometric techniques, one would detect differences. To arrive at the same design of optical interference, authenticating means it would be necessary not only to use the same automatic thin film synthesis program that was used to generate the prototype, but also to apply it to the problem in exactly the same way.

In another possible application a filter could be applied over a substrate bearing a signature or photograph on a valuable paper or identification document to afford protection against the forging of the signature or the substitution of photographs. For this application a combination of adhesives and coating materials forming the filter would be chosen such that the filter part of the optical interference, authenticating means could not be removed or transferred without being destroyed or damaged.

We claim:

1. An optical interference authenticating means, comprising a substrate integral with an article to be authenticated, and a filter composed of at least one optical interference layer overlying and attached to the said substrate, said filter having a known characteristic of spectral reflectance, and a different, known characteristic of spectral transmittance both of said characteristics varying with the angle of incidence of light on the said filter, and said substrate having at least a portion of the surface thereof, adjacent to said filter, coloured a particular colour to absorb at least some of the light transmitted through the said filter.

2. A means according to claim 1, wherein said surface adjacent to said filter is rough for diffuse reflection therefrom of light transmitted by said filter and not absorbed by said surface, and said filter is attached to the said substrate by a transparent cement.

3. A means according to claim 1, wherein said surface adjacent to said filter is substantially smooth for specular reflection.

4. A means according to claim 1, wherein the/or each optical interference layer is of a material selected from the group consisting of cryolite, $MgF_2$, SiO, $SiO_2$, $ThF_4$, ZnS, $TiO_2$, $ZrO_2$, Ag, Al, Au, Cu, Cr, Ge, Ni, NiCr and Si.

5. A means according to claim 1, wherein at least a portion of the surface of said substrate, adjacent said filter, is coloured black.

6. A means according to claim 1, wherein an outer, transparent or coloured protective film is provided on the said filter.

7. A means according to claim 1, wherein said substrate is an adhesive layer on said article to be authenticated and attaching the said filter thereto.

8. A means according to claim 1, wherein said substrate is a film carrier layer integral with said article to be authenticated.

* * * * *